US011116144B2

(12) United States Patent
Machata

(10) Patent No.: US 11,116,144 B2
(45) Date of Patent: Sep. 14, 2021

(54) PLANT TREATMENT SYSTEM AND METHOD

(71) Applicant: Matthew Machata, Lake Wales, FL (US)

(72) Inventor: Matthew Machata, Lake Wales, FL (US)

( * ) Notice: Subject to any disclaimer, the term of this patent is extended or adjusted under 35 U.S.C. 154(b) by 0 days.

(21) Appl. No.: 15/943,670

(22) Filed: Apr. 2, 2018

(65) Prior Publication Data
US 2018/0288945 A1 Oct. 11, 2018

Related U.S. Application Data

(60) Provisional application No. 62/479,519, filed on Mar. 31, 2017.

(51) Int. Cl.
*A01G 7/06* (2006.01)
*A01G 23/099* (2006.01)
*A01G 23/095* (2006.01)
*A01G 13/10* (2006.01)

(52) U.S. Cl.
CPC .............. *A01G 7/06* (2013.01); *A01G 13/10* (2013.01); *A01G 23/095* (2013.01); *A01G 23/099* (2013.01)

(58) Field of Classification Search
CPC ........ A01G 7/06; A01G 13/10; A01G 23/095; A01G 23/12; A01G 23/091; B27B 17/0091
USPC ....................................................... 144/34.1
See application file for complete search history.

(56) References Cited

U.S. PATENT DOCUMENTS

| 2,591,716 | A | * | 4/1952 | Murphy | A01G 23/12 222/174 |
| 2,645,058 | A | * | 7/1953 | Dukes | A01G 23/10 239/327 |
| 3,286,402 | A | * | 11/1966 | Newton | A01G 7/06 47/57.5 |
| 3,832,803 | A | * | 9/1974 | Blake | A01G 7/06 175/393 |
| 4,090,328 | A | * | 5/1978 | Enos, Jr. | A01G 7/06 47/12 |
| 4,924,571 | A | * | 5/1990 | Albertson | A01G 3/08 224/222 |

(Continued)

FOREIGN PATENT DOCUMENTS

| JP | 02214559 A | * | 8/1990 | A01G 7/06 |
| WO | WO-2012135252 A1 | * | 10/2012 | A01G 7/06 |
| WO | WO-2012177261 A1 | * | 12/2012 | A01G 3/088 |

*Primary Examiner* — Magdalena Topolski
(74) *Attorney, Agent, or Firm* — Cygnet IP Law, P.A.; Stephen W. Aycock, II

(57) ABSTRACT

Described are systems and methods for treating and/or helping prevent microbial infections on plants and trees by applying a treatment solution to cut areas of the plants or trees that have been exposed during a hedging or topping operation, or the like. The method can include providing a liquid application system including treatment liquid, wherein the liquid application system is integrated with at least one of a motorized hedging and/or topping vehicle, wherein the liquid application dispenses the treatment liquid at a controlled rate of flow from the one or more nozzles and the treatment liquid is applied directly and uniformly from the one or more nozzles on the second boom to the one or more cut areas at the controlled rate of flow.

17 Claims, 8 Drawing Sheets

(56) References Cited

U.S. PATENT DOCUMENTS

| | | | | |
|---|---|---|---|---|
| 4,996,830 | A * | 3/1991 | Davison | A01D 34/866 |
| | | | | 56/14.7 |
| 5,143,131 | A * | 9/1992 | Seigneur | B27B 17/025 |
| | | | | 144/24.13 |
| 5,329,752 | A * | 7/1994 | Milbourn | A01G 23/093 |
| | | | | 144/34.1 |
| 5,390,715 | A * | 2/1995 | Luscombe | A01G 3/08 |
| | | | | 144/24.13 |
| 5,426,854 | A * | 6/1995 | Leini | B27B 17/025 |
| | | | | 30/123.4 |
| 5,501,257 | A * | 3/1996 | Hickman | A01G 23/091 |
| | | | | 144/335 |
| 5,564,484 | A * | 10/1996 | Ketonen | B27B 17/02 |
| | | | | 118/40 |
| 5,718,050 | A * | 2/1998 | Keller | A01G 3/08 |
| | | | | 16/DIG. 12 |
| 6,286,250 | B1 * | 9/2001 | Johnson | A01G 7/06 |
| | | | | 47/1.5 |
| 6,497,088 | B1 * | 12/2002 | Holley | A01D 43/14 |
| | | | | 239/67 |
| 6,643,933 | B2 * | 11/2003 | Seigneur | B27B 17/025 |
| | | | | 144/34.6 |
| 6,990,770 | B2 * | 1/2006 | Terrell | A01G 3/08 |
| | | | | 144/24.12 |
| 10,412,900 | B2 * | 9/2019 | West | A01G 23/095 |
| 2007/0180740 | A1 * | 8/2007 | Crowley, Jr. | A01G 23/095 |
| | | | | 37/302 |
| 2009/0014251 | A1 * | 1/2009 | McCracken | A01G 23/095 |
| | | | | 187/272 |
| 2014/0169858 | A1 * | 6/2014 | Atta | A01G 23/12 |
| | | | | 401/195 |
| 2017/0086396 | A1 * | 3/2017 | Burch | A01C 15/02 |

\* cited by examiner

Side view

Rear view

Top view

PLANT TREATMENT SYSTEM AND METHOD

RELATED APPLICATIONS

This application claims the benefit of U.S. Provisional Application No. 62/479,519, entitled "PLANT TREATMENT SYSTEM AND METHOD" and filed on Mar. 31, 2017, which is incorporated herein by reference in its entirety.

TECHNICAL FIELD

Some implementations relate generally to agriculture, and more particularly, to systems and methods for treating microbial infections on plants and trees.

BACKGROUND

Plant and tree diseases cause serious economic damage worldwide every year. For example, in Florida, citrus greening (possibly caused by *candidatus liberibacter asiaticus*) is a serious threat to the state's citrus industry.

There may be a desire for systems and methods for treating food crops, plants, and trees to help prevent, reduce, or eliminate microbial infections and/or the effects of such infections, while leaving fruit or plants edible.

Some treatments may be applied to the leaves, but leaf application may suffer from a reduced efficiency. When applied to the woody tissue of a tree, such as a citrus tree, an efficiency increase may be achieved. The treatment may be applied via an injection to reach the woody tissue. However, injecting numerous trees, for example in a citrus grove, may be expensive and cumbersome.

Some implementations were conceived in light of the above-mentioned problems, needs, and limitations, among other things.

DETAILED DESCRIPTION

In general, some implementations include a method of applying a treatment or preventative solution (e.g., a bactericidal solution) to a cut area of a plant or tree immediately (or nearly immediately) following a cutting operation such as hedging or topping. By applying the treatment solution to the cut area of the pant or tree immediately after a cutting operation, the treatment solution may be able to reach the woody tissue of the pant or tree.

Some implementations can include hedger and/or a topper machine having a treatment application system attached to the hedger/topper in order to apply the treatment solution immediately after the hedging or topping operation. Some implementations can include a separate implement for application of the treatment, where the separate implement can follow the hedger/topper.

Figure 1:
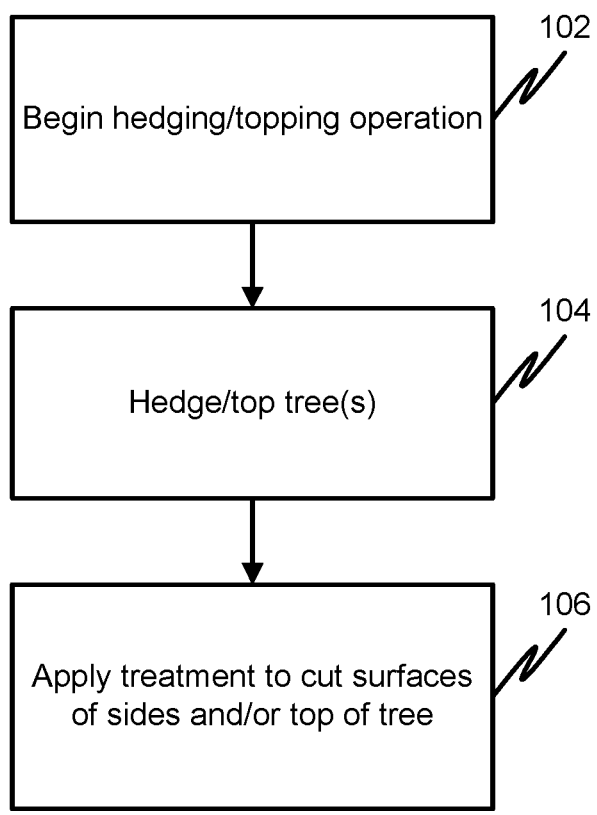
FIG. 1 is a flowchart of an example method of treating plants and/or trees in accordance with some implementations.

FIG. 1 is a flowchart of an example method of applying a liquid (e.g., a solution for treating and/or helping to prevent microbial infections of plants or trees, a liquid fertilizer, a liquid herbicide, or in general any liquid treatment where it may be beneficial for the liquid to reach the woody tissue of the plant or tree). The method begins at 102, where a hedging/topping operation is begun. Hedging and topping are operations that are performed periodically (e.g., seasonally, annually, etc.) to trim the sides and/or top of a plant or tree. For example, citrus trees are typically hedged and topped annually. The method continues to 104.

At 104, one or more plants or trees is hedged or topped. The hedging and topping operations may be carried out separately by different machines, one for hedging and one for topping. Alternatively, there may be a combined hedger/topper machine. The method continues to 106.

Figure 2:
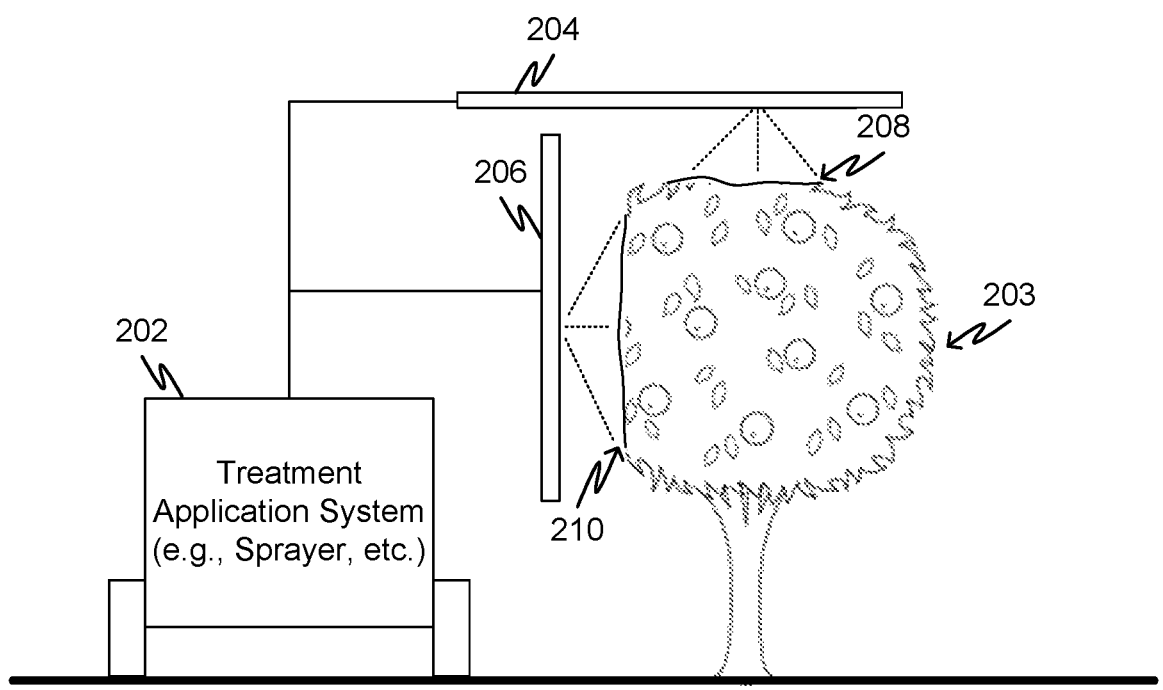
FIG. 2 is a diagram of an example system for treating plants and/or trees in accordance with some implementations.

At 106, a treatment (e.g., liquid treatment solution, or the like) is applied to a freshly cut area (e.g., side and/or top) of a plant or tree. Immediately (or nearly immediately) after a hedging or topping operation, woody tissue of a plant or tree is exposed and has moist sap. Immediately (or nearly immediately) after the cutting (hedging or topping) a liquid treatment (e.g., a liquid bactericidal solution, for example: Mycoshield manufactured by Nufarm; and/or FireLine, FireWall, etc. manufactured by AgroSource; or the like) applied to the exposed woody tissue will be absorbed into the woody tissue of the plant or tree. A treatment solution can include water, a bactericide (such as one of the ones mentioned above), and, optionally, a surfactant. The treatment solution preferably is applied before the sap of the cut area dries. Using the above method, a need for injecting treatment solution into woody tissue of a pant or tree may be reduced or eliminated and/or an efficiency increase may be achieved compared to foliar application. The treatment may be applied as shown in FIG. 2 using an apparatus as shown in FIGS. 3-8. It will be appreciated that the above steps may be repeated in whole or in part in order to accomplish a contemplated plant/tree treatment.

FIG. 2 shows a diagram of a treatment system 202 in accordance with some implementations being used to treat a hedged and topped tree 203. The treatment system 202 can include one or both of a horizontal spray member 204 having one or more horizontal application nozzles to apply a treatment solution to a topped portion 208 of the tree 203, and/or a vertical spray member 206 having one or more vertical spray nozzles to apply a treatment solution to a hedged section 210 of the tree 203. It will be appreciated that dedicated hedger or topper may have only one of 206 and 204, respectively.

Figure 3:
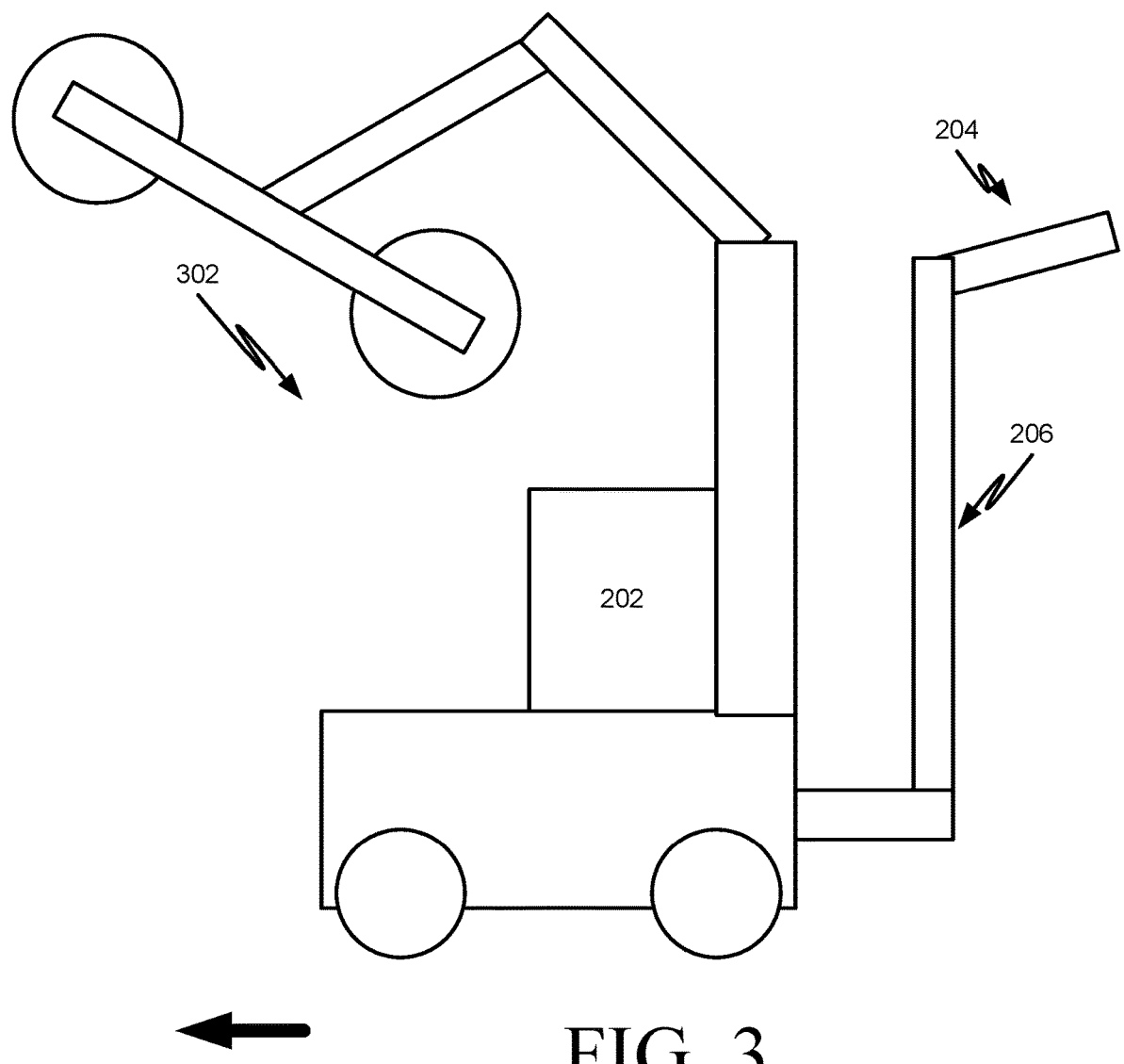
FIG. 3 is a diagram of an example hedger/topper configured with a treatment system in accordance with some implementations.

FIG. 3 shows a diagram of an example hedger/topper 302 that includes a treatment system as described herein. The treatment system can include a treatment application device 202, a vertical application member 206 and/or a horizontal application member 204, which operate as described above.

It will be appreciated that while examples have been described in terms of system and method configured for both hedging (or vertical trimming) and topping (or horizontal trimming), some implementations could include a machine dedicated for just hedging or just topping. Such dedicated purpose hedging or topping systems would include a corresponding application member (e.g., 206 or 204, respectively). Also, a hedging/topping system may perform one operation at a time. For example, the system may make a first pass to hedge a row of trees and then a second pass to top that row of trees. In such cases, the treatment application system could be configured to have a selectable application delivery to the sides only (for hedging), to the top only (for topping), or to both the sides and the tops (for simultaneous hedging and topping). A dual purpose hedger/topper may include both 204 and 206.

Figure 4:
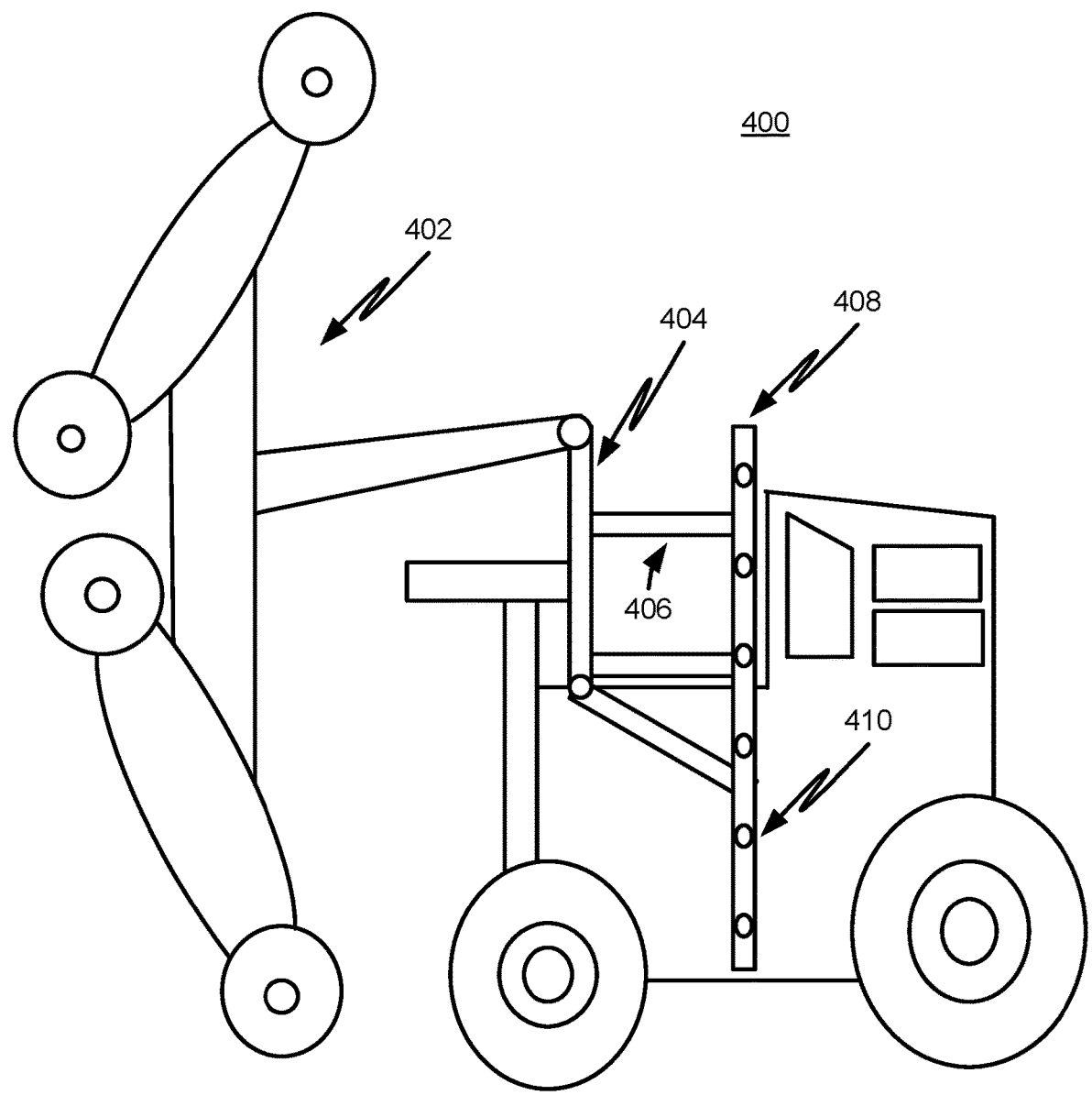
FIG. 4 is a diagram of an example hedger configured with a treatment system in accordance with some implementations.

FIG. 4 is a diagram of an example hedger tractor 400 configured with a treatment system in accordance with some implementations. The hedger tractor 400 includes a cutting boom 402, a cutting boom support member 404, one or more attachment boom(s) 406, a spray boom 408, and one or more spray nozzles 410. It will be appreciated that FIG. 4 is showing one side of the hedger 400 and that the other side of the hedger 400 can have a similar configuration (e.g., another set of 402-410).

Figure 5:
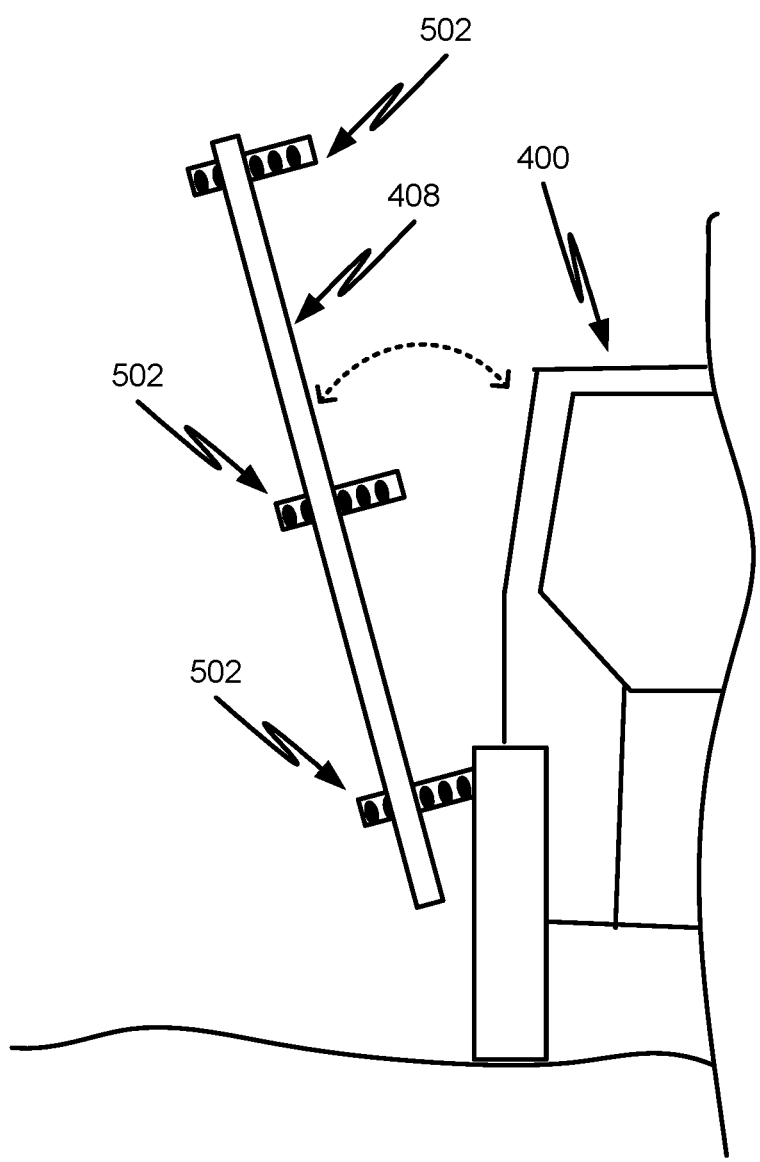
FIG. 5 is a diagram of an example hedger configured with a treatment system having an adjustable spray boom in accordance with some implementations.

In operation, as the hedger 400 is moving down a rows of trees performing a hedging operation, the spray boom 408 is connected to the cutting boom 402 and can be configured to have an angle that adjusts with the angle of the cutting boom 402 (as shown in FIG. 5). Spray supplied by liquid supply system, e.g., a tank, a pump and connecting liquid transfer lines, to the spray boom 408 and exiting out the spray nozzles 410 is applied to parts of the trees that have just been cut by blades on the cutting boom. The application of spray from the liquid supply system can include a control panel mounted inside an operator control cabin of the hedger 400 and can include controls to control the rate of flow of the liquid to the spray nozzles, pressure of the liquid to the spray nozzles, etc.

FIG. 5 is a diagram of an example hedger configured with a treatment system having an adjustable spray boom in accordance with some implementations. The spray boom 408 is connected to the attachment boom(s) 406 via adjustable attachment connector(s) 502. The adjustable attachment connectors 502 permit the spray boom 408 position to be adjusted (as shown in grater detailed in FIGS. 6-8) to set a desired distance between the spray boom 408 and the trees (or plants) being treated.

Figure 6:
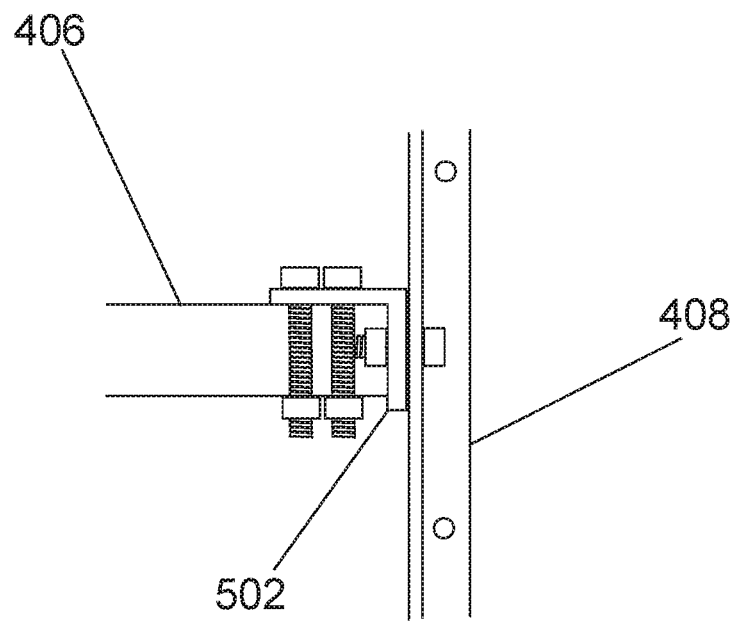
FIGS. 6-8 are diagrams showing details of an adjustable spray boom connection system in accordance with some implementations.
Figure 7:
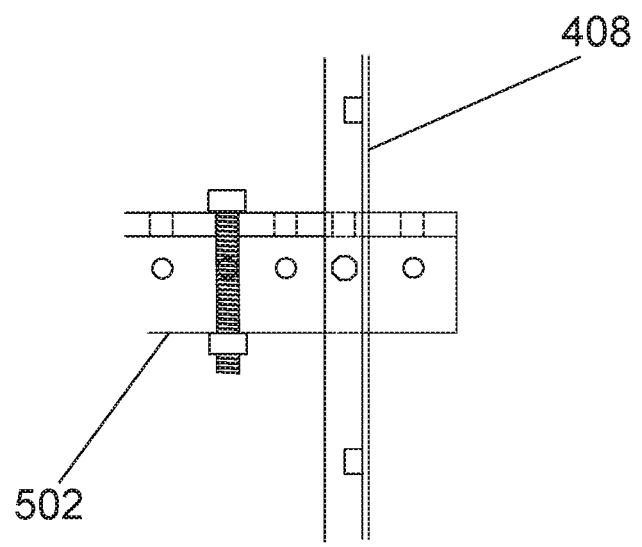
Figure 8:
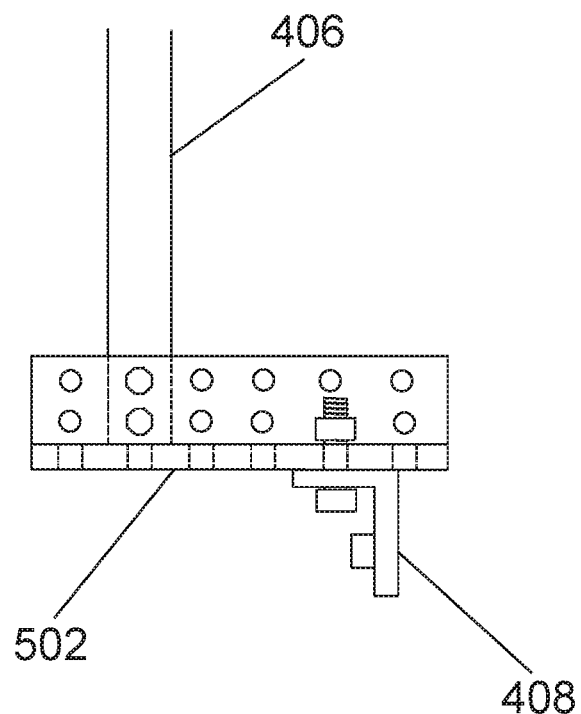

FIGS. 6-8 are diagrams showing details of an adjustable spray boom connection system in accordance with some implementations.

It is, therefore, apparent that there is provided, in accordance with the various embodiments disclosed herein, systems and methods for treating or helping prevent microbial infections on plants and trees.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A method of at least one of treating or preventing microbial infections on at least one of plants or trees, the method comprising:
    providing a liquid application system including treatment liquid, wherein the liquid application system is integrated with at least one of a motorized hedging vehicle or a motorized topping vehicle, wherein the liquid application system includes one or more nozzles positioned substantially perpendicular to one or more cutting blades of the motorized hedging vehicle or the motorized topping vehicle, wherein the liquid application system dispenses the treatment liquid at a controlled rate of flow from the one or more nozzles, and wherein the one or more cutting blades are disposed on a first boom and the one or more nozzles are disposed on second boom different than the first boom;
    at least one of hedging or topping at least one of one or more plants or one or more trees using the one or more rotary cutting blades to produce one or more cut areas on at least one of the one or more plants or the one or more trees; and
    applying the treatment liquid to the one or more cut areas immediately after at least one of the hedging or topping operation using the liquid application system integrated with at least one of the motorized hedging vehicle or the motorized topping vehicle, wherein the one or more nozzles are positioned substantially perpendicular to the one or more cut areas, and wherein the treatment liquid is applied directly and uniformly from the one or more nozzles on the second boom to the one or more cut areas at the controlled rate of flow.

2. The method of claim 1, wherein the treatment liquid includes a liquid bactericidal solution, and one or more of water or a surfactant.

3. The method of claim 1, wherein the treatment liquid is applied before sap of the one or more cut areas dries.

4. The method of claim 1, wherein the one or more cut areas expose woody tissue of at least one of the one or more plants or the one or more trees, and wherein the one or more cut areas have moist sap, and wherein the treatment liquid, including a bactericide, is applied before the moist sap of the one or more cut areas dries.

5. The method of claim 1, wherein the second boom is configured to have a second angle that adjusts based on a first angle of the first boom, and wherein the second boom position is adjusted to set a desired distance between the second boom and the one or more of trees or plants.

6. The method of claim 5, wherein the second boom is positioned in at least one of a horizontal direction with the one or more nozzles positioned in a vertical direction or a vertical direction with the one or more nozzles positioned in a horizontal direction.

7. A method of at least one of treating or preventing microbial infections on at least one of plants or trees, the method comprising:
    providing a liquid application system including treatment liquid, wherein the liquid application system includes one or more nozzles and is integrated with at least one of a motorized hedging vehicle machine having one or more circular cutting blades or a motorized topping vehicle machine having one or more circular cutting blades, and wherein the liquid application system includes a spray boom connected to a cutting boom, wherein the spray boom is configured to have a first angle that adjusts based on a second angle of the cutting boom, and wherein the spray boom position is adjusted to set a desired distance between the spray boom and one or more trees or one or more plants;
    at least one of hedging or topping the one or more plants or the one or more trees using the one or more circular cutting blades to produce one or more cut areas of the one or more plants or the one or more trees; and
    applying the treatment liquid to the one or more cut areas immediately after at least one of the hedging or topping operation using the liquid application system integrated with at least one of the motorized hedging vehicle machine or the motorized topping vehicle machine.

8. The method of claim 7, wherein the treatment liquid is applied before sap of the one or more cut areas dries.

9. The method of claim 7, wherein the one or more cut areas expose woody tissue of at least one of the one or more plants or the one or more trees, and wherein the one or more cut areas have moist sap, and wherein the treatment liquid, including a bactericide, is applied before the moist sap of the one or more cut areas dries.

10. The method of claim 7, wherein the spray boom is positioned in at least one of a horizontal direction with the one or more nozzles positioned in a vertical direction or a vertical direction with the one or more nozzles positioned in a horizontal direction.

11. The method of claim 7, wherein the treatment liquid includes a liquid bactericidal solution, and one or more of water or a surfactant.

12. A method of at least one of treating or preventing microbial infections on at least one of plants or trees, the method comprising:

providing a liquid application system including treatment liquid, wherein the liquid application system includes one or more nozzles and is integrated with at least one of a motorized hedging machine or a motorized topping machine, wherein the liquid application system dispenses the treatment liquid at a controlled rate of flow from the one or more nozzles, and wherein the one or more cutting blades are disposed on a first boom and the one or more nozzles are disposed on second boom different than the first boom;

at least one of hedging or topping at least one of one or more plants or one or more trees to produce one or more cut areas on at least one of the one or more plants or the one or more trees; and applying the treatment liquid to the one or more cut areas immediately after at least one of the hedging or topping operation using the liquid application system integrated with at least one of the motorized hedging vehicle machine or the motorized topping vehicle, and wherein the treatment liquid is applied directly and uniformly from the nozzles to the one or more cut areas by the liquid application system at the controlled rate of flow.

13. The method of claim 12, wherein the treatment liquid is applied before sap of the one or more cut areas dries.

14. The method of claim 12, wherein the one or more cut areas expose woody tissue of at least one of the one or more plants or the one or more trees, and wherein the one or more cut areas have moist sap, and wherein the treatment liquid, including a bactericide, is applied before the moist sap of the one or more cut areas dries.

15. The method of claim 12, wherein the liquid application system includes a spray boom connected to a cutting boom, wherein the spray boom is configured to have a first angle that adjusts based on a second angle of the cutting boom, and wherein the spray boom position is adjusted to set a desired distance between the spray boom and the one or more of trees or plants.

16. The method of claim 15, wherein the spray boom is positioned in at least one of a horizontal direction with the one or more nozzles positioned in a vertical direction or a vertical direction with the one or more nozzles positioned in a horizontal direction.

17. The method of claim 12, wherein the treatment liquid includes a liquid bactericidal solution, and one or more of water or a surfactant.

* * * * *